United States Patent
Yokokawa et al.

(10) Patent No.: US 8,624,533 B2
(45) Date of Patent: Jan. 7, 2014

(54) INVERTER POWER GENERATOR

(75) Inventors: Narutoshi Yokokawa, Mishima (JP); Tomoyuki Hoshikawa, Numazu (JP); Kazumi Murata, Numazu (JP); Junichi Kanai, Niigata (JP); Naoyuki Mashima, Tsubame (JP)

(73) Assignee: Toshiba Kikai Kabushiki Kaisha, Tokyo (JP)

(*) Notice: Subject to any disclaimer, the term of this patent is extended or adjusted under 35 U.S.C. 154(b) by 119 days.

(21) Appl. No.: 13/416,643

(22) Filed: Mar. 9, 2012

(65) Prior Publication Data
US 2012/0229065 A1 Sep. 13, 2012

(30) Foreign Application Priority Data

Mar. 11, 2011 (JP) ................................ 2011-054533

(51) Int. Cl.
- *H03K 5/00* (2006.01)
- *H02H 7/09* (2006.01)
- *H02P 23/00* (2006.01)
- *H02P 27/04* (2006.01)

(52) U.S. Cl.
USPC ............... 318/400.13; 318/400.22; 318/799; 318/801; 318/805; 318/807; 318/811

(58) Field of Classification Search
USPC ............... 318/400.13, 400.22, 799, 801, 805, 318/807, 811
See application file for complete search history.

(56) References Cited

U.S. PATENT DOCUMENTS

| | | | | |
|---|---|---|---|---|
| 4,315,203 | A * | 2/1982 | Ibamoto et al. | 318/807 |
| 6,005,784 | A * | 12/1999 | Ikeshita | 363/37 |
| 2009/0251103 | A1* | 10/2009 | Yamamoto et al. | 320/133 |
| 2010/0019740 | A1* | 1/2010 | Hashimoto et al. | 322/58 |
| 2010/0277149 | A1* | 11/2010 | Furutani et al. | 323/282 |
| 2011/0307108 | A1* | 12/2011 | Nakano et al. | 700/287 |

FOREIGN PATENT DOCUMENTS

JP 2003-111428 4/2003

OTHER PUBLICATIONS

English Language Abstract of JP 2003-111428 published Apr. 11, 2003.
English Language Translation of JP 2003-111428 published Apr. 11, 2003.

* cited by examiner

*Primary Examiner* — Lincoln Donovan
*Assistant Examiner* — Gabriel Agared
(74) *Attorney, Agent, or Firm* — DLA Piper LLP (US)

(57) ABSTRACT

An inverter includes a voltage command generator generating a voltage command value according to an externally specified voltage value, a PWM signal generator generating a PWM signal according to the voltage command value and frequency command value, and a switching unit generating a three-phase AC power according to the PWM signal. The voltage command generator decreases the voltage command value if the output current increases, to prevent the rotation speed of a prime move from suddenly changing. If the output current exceeds a preset upper current threshold, the voltage command value is clamped at a preset minimum output voltage, thereby securing the minimum output voltage for an increase in the output current.

8 Claims, 10 Drawing Sheets

INVERTER POWER GENERATOR

BACKGROUND OF THE INVENTION

1. Field of the Invention

The present invention relates to an inverter power generator that generates AC power with a synchronous motor driven by a prime mover such as an engine, converts the AC power into DC power, and inverts the DC power with an inverter into AC power of a required frequency.

2. Description of Related Art

The inverter power generator is widely used to generate electric power with the use of a prime mover such as an engine. The inverter power generator connects an output shaft of the engine to a rotary shaft of a synchronous motor, drives the synchronous motor with the engine to generate AC power, converts the AC power with a converter into DC power, and inverts the DC power with an inverter into AC output power of required voltage and frequency. The AC output power is supplied to a load such as a motor, a lamp, or the like that is connected to the inverter.

If the load connected to the inverter of the inverter power generator is a motor (hereinafter referred to as "load motor") such as an induction motor, there is a possibility that the load motor causes a rush current at startup to cause an excessive current to semiconductor elements arranged in a control unit of the inverter. If the excessive current is larger than a maximum rated current of the semiconductor elements, the semiconductor elements will malfunction to break the control unit.

To prevent this problem, Japanese Unexamined Patent Application Publication No. 2003-111428 (Patent Document 1) discloses a technique of dropping an output voltage of the inverter according to the magnitude of an output current of the inverter, thereby suppressing a load current and a current passed to the control unit.

SUMMARY OF THE INVENTION

The related art disclosed in Patent Document 1, however, unreasonably drops the output voltage of the inverter power generator, to cause troubles such as disconnecting a load contactor such as an electromagnetic switch for starting and stopping the load motor and resetting a control unit in the load motor. Namely, the related art is unable to smoothly start and drive the load motor.

To solve the problems of the related art, the present invention provides an inverter power generator capable of suppressing a rush current at startup of a load, thereby protecting internal circuits of the inverter power generator and preventing a contactor for the load from being unnecessarily disconnected.

According to an aspect of the present invention, the inverter power generator includes a prime mover, a synchronous motor coupled with the prime mover, a converter connected to the synchronous motor, an inverter connected to the converter, and a capacitor arranged between the converter and the inverter. The prime mover rotates the synchronous motor to generate AC power, the converter converts the AC power into DC power, and the inverter inverts the DC power into AC power of a required frequency. The inverter includes a voltage command generator that generates a voltage command value according to an externally specified voltage value, a frequency command generator that generates a frequency command value according to an externally specified frequency value, a PWM signal generator that generates a PWM signal according to the voltage command value and frequency command value, a switching unit that includes a plurality of semiconductor elements, turns on/off the semiconductor elements according to the PWM signal, and generates the AC power of the required frequency, and a current detector that detects an output current (line current) of the switching unit. The voltage command generator includes a voltage command changer that generates a voltage value corresponding to the externally specified voltage value if it is a normal state in which the output current detected by the current detector is equal to or lower than a preset upper current threshold, and if the output current is higher the upper current threshold, a voltage value corresponding to a minimum output voltage that is preset to be lower than the externally specified voltage value. The voltage command generator outputs the voltage value generated by the voltage command changer as the voltage command value.

DESCRIPTION OF PREFERRED EMBODIMENTS

Figure 1:
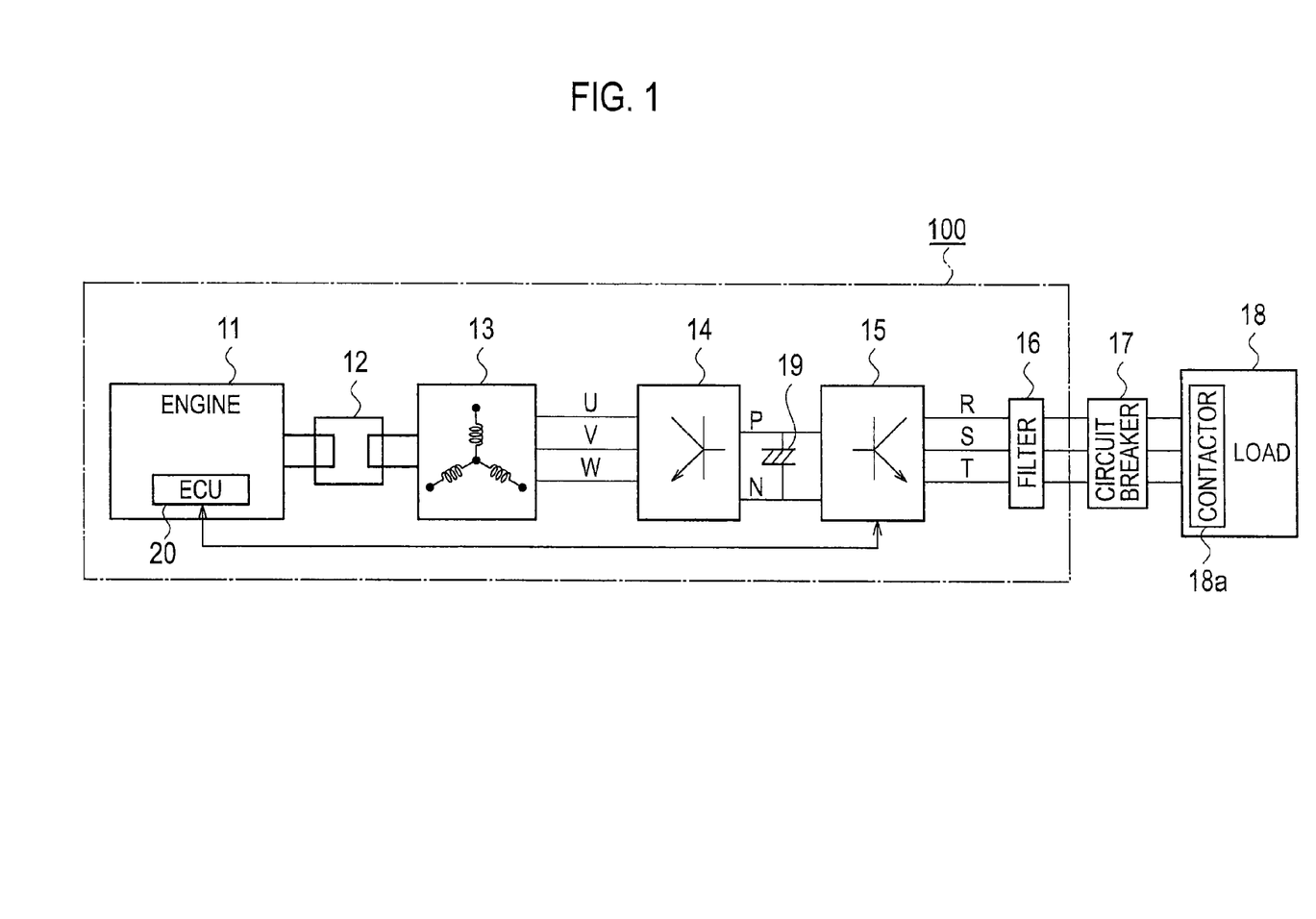
FIG. 1 is a block diagram illustrating an inverter power generator according to an embodiment of the present invention.

An inverter power generator according to an embodiment of the present invention will be explained with reference to the drawings. FIG. 1 is a block diagram illustrating the inverter power generator 100 according to the embodiment. The inverter power generator 100 includes a prime mover, i.e., an engine 11 such as a diesel engine, a gasoline engine, or the like, a synchronous motor 13 that is driven by the engine 11 and generates three-phase (U, V, W) AC voltage, a coupling 12 that couples an output shaft of the engine 11 and a rotation shaft of the synchronous motor 13 with each other, a converter 14 that is connected to the synchronous motor 13 and converts the three-phase AC voltage into PN DC voltage, an inverter 15 that inverts the PN DC voltage into three-phase (R, S, T) AC voltage, a main-circuit capacitor 19 that is arranged in wiring between the converter 14 and the inverter 15, and an LC filter 16 that is connected to the inverter 15 and reduces switching noise.

The LC filter 16 is connected through a circuit breaker 17 to a load 18 such as an induction motor. Although FIG. 1 illustrates one circuit breaker 17 and one load 18, it is general to arrange a plurality of circuit breakers and loads after the LC filter 16. If the load 18 is an induction motor, it is general to arrange a contactor 18a in a first stage of the load 1, to start and stop the induction motor. The synchronous motor 13 may be an IPM motor that embeds permanent magnets in a rotor.

The engine 11 is connected to an ECU (engine control unit) 20 that controls the rotation of the engine 11.

The converter 14 has semiconductor switching elements such as transistors, IGBTs, MOSFETs, or the like and diodes. With these switching elements, the converter 14 converts three-phase (U, V, W) AC voltage into PN DC voltage. According to power consumption of the load 18, the converter 14 provides a proper current to the synchronous motor 13, to generate required power without frequently changing the rotation speed of the engine 11. Unlike a standard rectifier, the converter 14 converts the three-phase AC voltage generated by the synchronous motor 13 into PN DC voltage of a required magnitude, and at the same time, provides a current to the synchronous motor 13 according to output power to the load 18 so that the synchronous motor 13 may stably generate power in response to variations in the load 18.

The main-circuit capacitor 19 smoothes the PN DC voltage from the converter 14 and accumulates power so that the inverter 15 may output large power.

Similar to the converter 14, the inverter 15 has semiconductor switching elements such as transistors, IGBTs, MOSFETs, or the like and diodes. With these switching elements, the inverter 15 inverts the smoothed PN DC voltage into three-phase (R, S, T) AC voltage. By changing switching patterns of the switching elements from one to another, the inverter 15 is able to output an optional voltage value and an optional frequency value.

Figure 2:
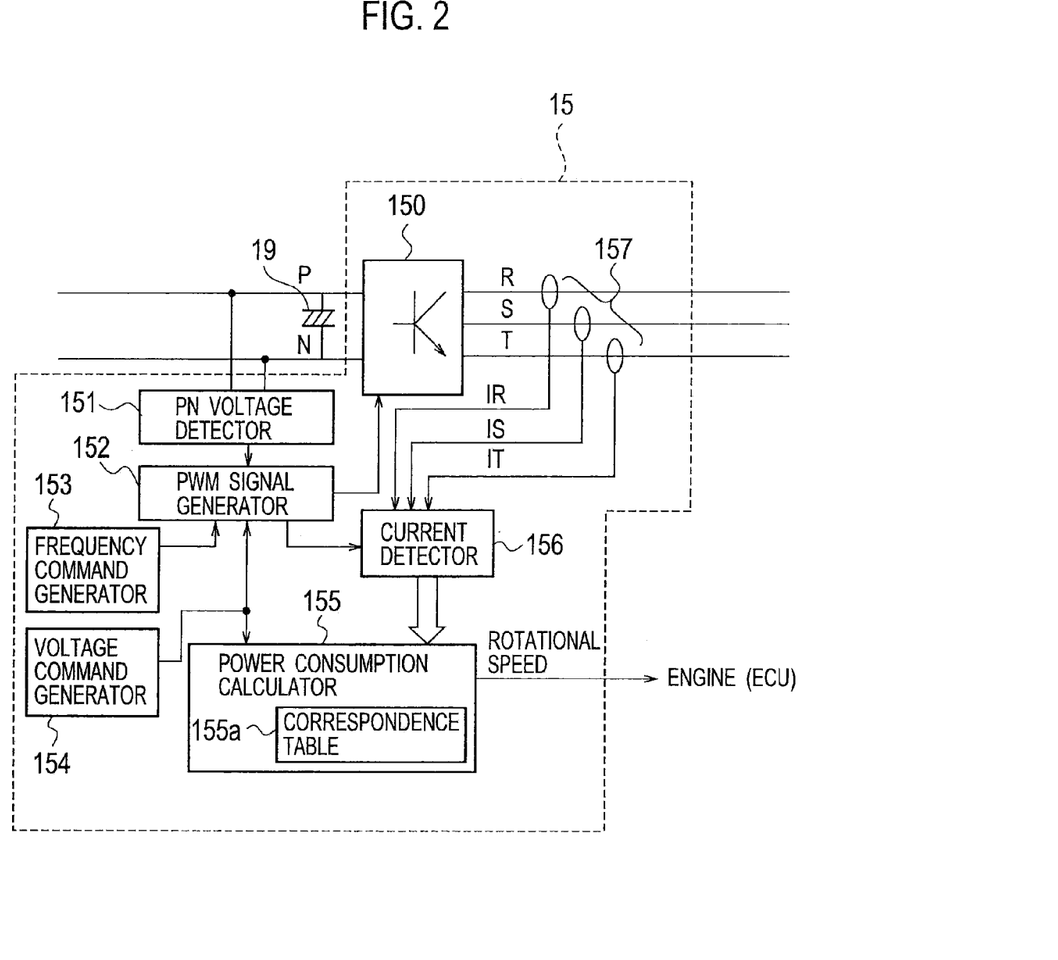
FIG. 2 is a block diagram illustrating an inverter of the inverter power generator of FIG. 1.

FIG. 2 is a block diagram illustrating the details of the inverter 15. The inverter 15 includes a switching circuit (switching unit) 150 that employs semiconductor switching elements to invert PN DC voltage into three-phase AC voltage, a PN voltage detector 151 that detects a voltage of the main-circuit capacitor 19, a frequency command generator 153 that outputs a frequency command value for the three-phase AC voltage to be generated by the switching circuit 150, and a voltage command generator 154 that outputs a voltage command value for the three-phase AC voltage to be generated by the switching circuit 150.

The inverter 15 also includes a PWM signal generator 152 that generates a PWM signal according to the frequency command value from the frequency command generator 153, the voltage command value from the voltage command generator 154, and the detected PN voltage value from the PN voltage detector 151 and outputs the PWM signal to the switching circuit 150.

The inverter 15 also includes an ammeter (current detector) 157 that detects R-, S-, and T-phase line currents IR, IS, and IT outputted from the switching circuit 150, a current detector 156 that provides two-phase axial (d-axis, q-axis) current signals according to the line currents IR, IS, and IT from the ammeter 157 and the PWM signal from the PWM signal generator 152, and a power consumption calculator 155 that calculates power consumption of the load 18 (FIG. 1) according to the two-phase axial current signals from the current detector 156.

Figure 11:
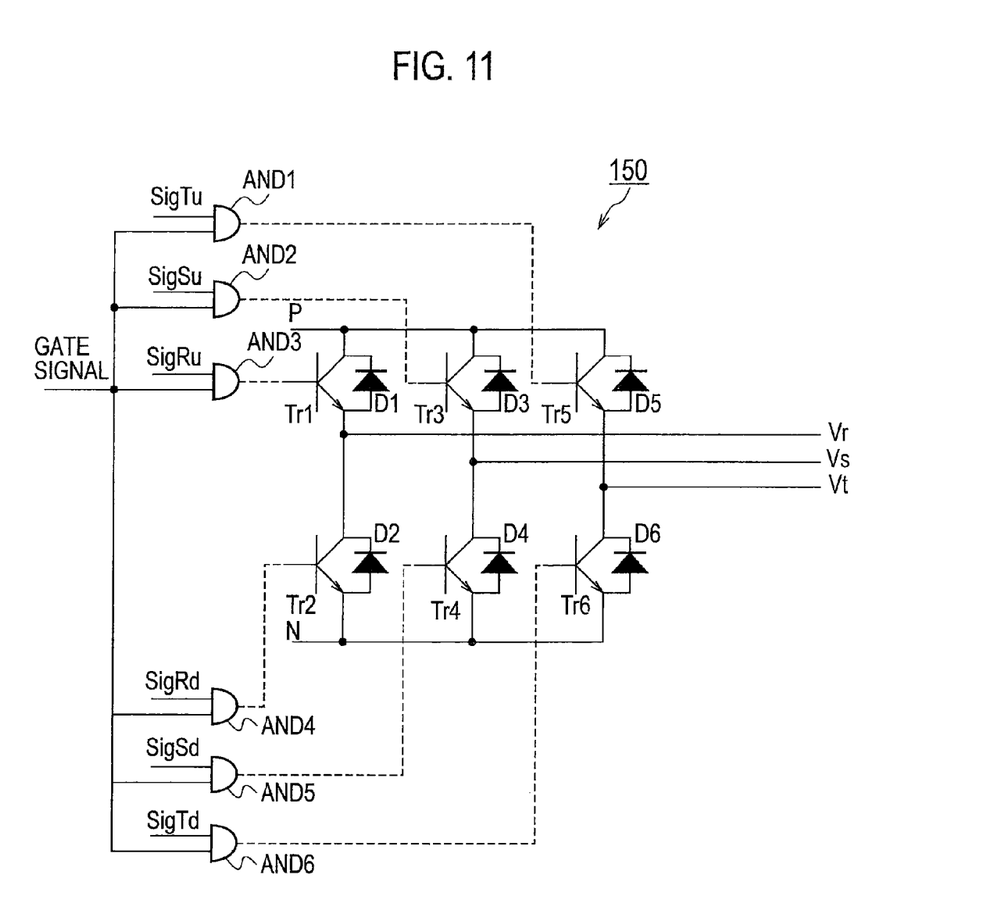
FIG. 11 is a circuit diagram illustrating a switching circuit arranged in the inverter of FIG. 2.

The switching circuit 150 includes, as illustrated in FIG. 11, six transistors Tr1 to Tr6 and diodes D1 to D6 connected in parallel with the transistors Tr1 to Tr6, respectively. The transistors Tr1 and Tr2 are connected in series. A collector of the transistor Tr1 is connected to a positive (P) electrode. An emitter of the transistor Tr2 is connected to a negative (N) electrode. A connection point between the transistors Tr1 and Tr2 is an output point for providing an R-phase voltage Vr. Similarly, the transistors Tr3 and Tr4 are connected in series and a connection point between them is an output point for providing an S-phase voltage Vs. The transistors Tr5 and Tr6 are connected in series and a connection point between them is an output point for providing a T-phase voltage Vt.

The switching circuit 150 also includes six AND gates AND1 to AND6. A first input terminal of each of the AND gates AND1 to AND6 receives a gate signal to control power supply. Second terminals of the AND gates AND1 to AND6 receive PWM signals SigTu, SigSu, SigRu, SigRd, SigSd, and SigTd, respectively, from the PWM signal generator 152. When the gate signal is ON (high level), the respective PWM signals drive the transistors Tr1 to Tr6, to provide the three-phase AC voltages Vr, Vs, and Vt. When the gate signal is OFF (low level), the transistors Tr1 to Tr6 are inactive without regard to the PWM signals. The transistors Tr1, Tr3, and Tr5 and diodes D1, D3, and D5 on an upper side of the switching circuit 150 form an upper arm and the transistors Tr2, Tr4, and Tr6 and diodes D2, D4, and D6 on a lower side of the switching circuit 150 form a lower arm.

The power consumption calculator 155 (FIG. 2) is provided with a correspondence table 155a that indicates a relationship between power consumption and rotational speed of engine. The power consumption calculator 155 calculates power consumption of the load 18, and according to the calculated power consumption and the correspondence table 155a, finds rotational speed data for the engine 11. The rotational speed data is transmitted to the ECU 20 of the engine 11. According to the transmitted rotational speed data, the ECU 20 controls the engine 11 to a required engine speed.

Figure 7:
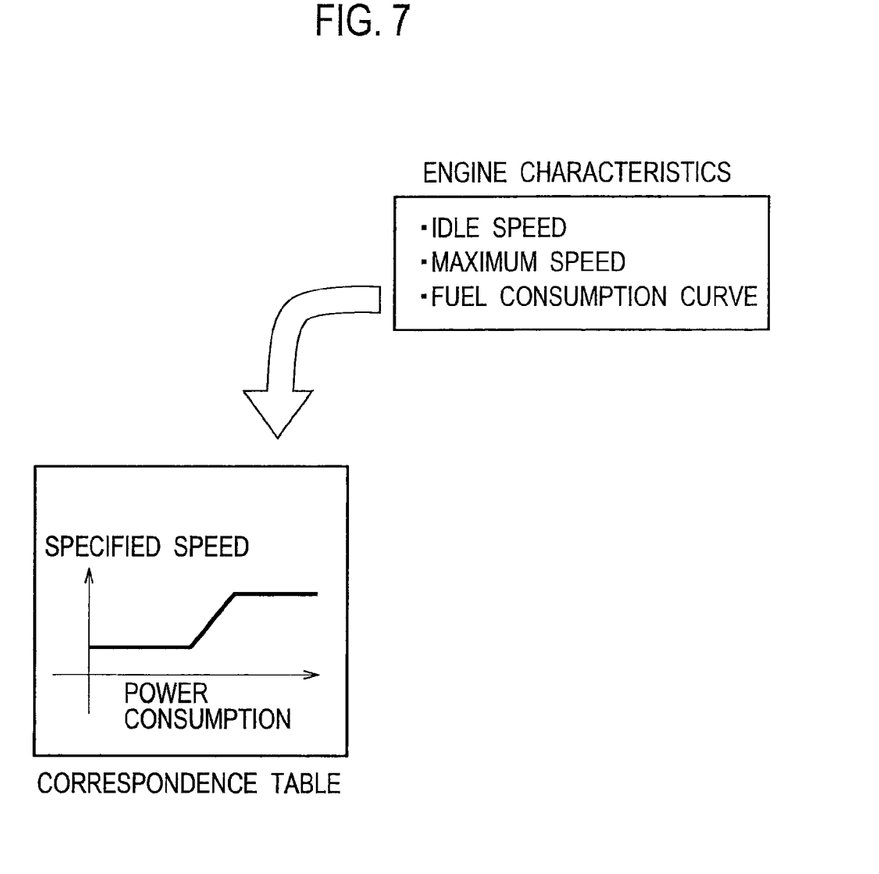
FIG. 7 is a view illustrating a correspondence table used by a power consumption calculator of the inverter of FIG. 2.

The correspondence table 155a indicates, as illustrated in FIG. 7, a relationship between power consumption of the load 18 and rotation speed of the engine 11. The correspondence table 155a is prepared according to a fuel consumption curve of the engine 11 and is used to find a proper rotation speed of the engine 11 to generate power that meets the power consumption of the load 18 plus a predetermined margin. According to the embodiment, the engine 11 is set to an idle rotation speed if the power consumption of the load 18 is low or zero, and as the power consumption increases, is linearly increased and clamped at a maximum rotation speed.

The details of the PWM signal generator 152 and current detector 156 will be explained with reference to FIG. 3. The PWM signal generator 152 includes a voltage corrector 31 that corrects a q-axis voltage contained in a two-phase (d-axis, q-axis) voltage command value, a 2-to-3 phase converter 32, a PWM waveform converter 33 that generates a three-phase PWM signal according to a three-phase (R, S, T) voltage signal, and an electric angle generator 34.

The voltage corrector 31 multiplies the voltage command value by a ratio of (Set PN voltage value)/(Detected PN voltage value), i.e., a ratio of (Set PN voltage value)/(Feedback PN voltage value), thereby correcting the q-axis voltage contained in the voltage command value. The corrected q-axis voltage is supplied to the 2-to-3 phase converter 32.

The 2-to-3 phase converter 32 carries out 2-to-3 phase conversion according to the corrected q-axis voltage and a d-axis voltage contained in the voltage command value, so that the PWM signal generator 152 may generate three-phase (R, S, T), six-arm PWM signals. The generated PWM signals (SigTu, SigSu, SigRu, SigRd, SigSd, SigTd) are supplied to the switching circuit 150 (FIG. 2), to drive the transistors Tr1 to Tr6 (FIG. 11).

The electric angle generator 34 finds an electric angle for the three-phase (R, S, T) voltage according to a frequency command value from the frequency command generator 153

(FIG. 2). The found electric angle is supplied to the 2-to-3 phase converter 32 and current detector 156. The electric angle is determined so that an electric period agrees with an electric angle range of 0 to 360 degrees. If the frequency command value is 50 Hz, an electric period is 20 msec, and therefore, an electric angle is generated so that a period of 20 ms agrees with 0 to 360 degrees.

Figure 3:
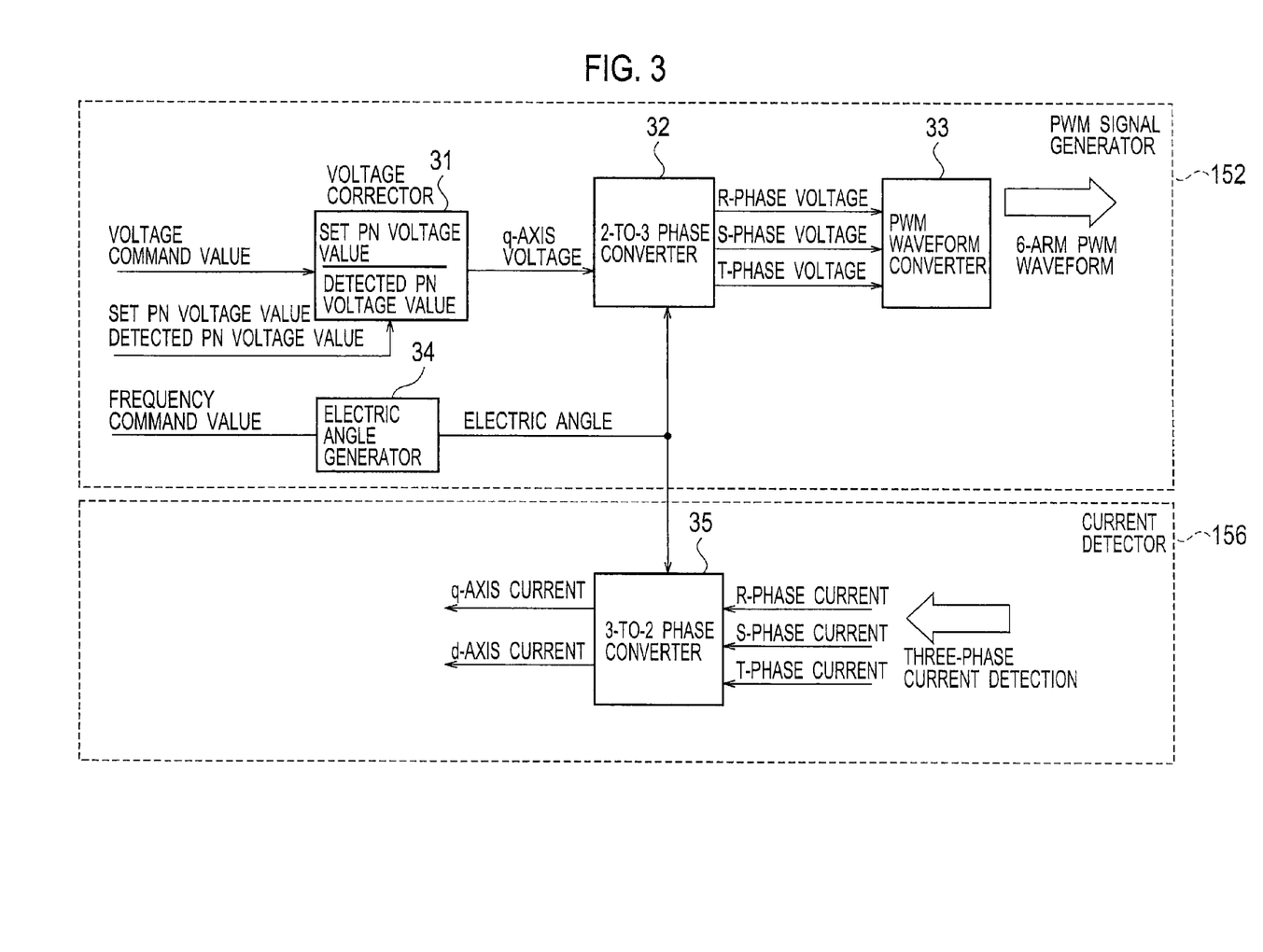
FIG. 3 is a block diagram illustrating a PWM signal generator and a current detector of the inverter of FIG. 2.

The current detector 156 illustrated in FIG. 3 includes a 3-to-2 phase converter 35 that uses the R-, S-, and T-phase currents IR, IS, and IT detected by the current meter 157 (FIG. 2) and the electric angle from the electric angle generator 34, to provide two-phase current, i.e., d- and q-axis currents to the power consumption calculator 155 (FIG. 2).

A power consumption calculating procedure carried out by the power consumption calculator 155 will be explained. With an externally specified voltage value Va (specified from outside the inverter 15), the voltage command value Vb from the voltage command generator 154 (an output voltage of the inverter 15), a three-phase line current I1, the q-axis current Iq, and the d-axis current Id, the power consumption calculator 155 calculates instantaneous power consumption P1 of the load 18 as follows:

$$P_1 = \sqrt{3} \times \frac{Va^2}{Vb/(I_1 \times I_q / \sqrt{I_q^2 + I_d^2})}. \quad (1)$$

The denominator of the right side of the expression (1) indicates an impedance of effective power. Representing this impedance with Z, the expression (1) becomes as, $$P_1 = \sqrt{3} \times \frac{(\text{Externally specified voltage})^2}{Z}. \quad (2)$$

The expression (2) expresses the instantaneous power consumption P1 of the load 18 with the externally specified voltage value Va and the impedance Z of effective power. Accordingly, even if a rush current occurs at startup of the load 18 to suddenly decrease the output voltage of the inverter 15, the power consumption calculated by the power consumption calculator 155 will never suddenly drops. Namely, even if the output voltage of the inverter 15 suddenly changes, the rotation speed of the engine 11 is prevented from suddenly varying, and therefore, the engine 11 is stable. When calculating the power consumption P1, the power consumption calculator 155 does not use a voltage output value of the switching circuit 150, and therefore, is not affected by ripples.

The details of the voltage command generator 154 illustrated in FIG. 2 will be explained with reference to FIG. 4. The voltage command generator 154 receives an externally specified voltage value and a minimum output voltage from the outside of the inverter 15 a line current obtained by $(Iq^2 + Id^2)^{1/2}$, and an upper current threshold. The voltage command generator 154 includes a multiplier 41 that multiplies the externally specified voltage value by a coefficient G1, a multiplier (corrector) 42 that multiplies an output signal from the multiplier 41 by a coefficient G2, an operation unit (voltage command changer) 43, and a low-pass filter 44.

The minimum output voltage is set to be lower than the externally specified voltage value and to be insufficient to break the contactor 18a that controls the start and stop of the load 18.

The multiplier 41 multiplies the externally specified voltage value that is provided from the outside of the inverter 15 by the coefficient G1 that is expressed by, $$G_1 = 1/\{1 - (\text{PWM frequency}) \times (\text{Dead time}) \times 2\} \quad (3).$$

The coefficient G1 expressed with the expression (3) is a coefficient that corrects dead time used when driving the transistors Tr1, Tr3, and Tr5 of the upper aim and the transistors Tr2, Tr4, and Tr6 of the lower aim in the switching circuit 150 of FIG. 11. The dead time is a period during which the upper and lower arms are both OFF and is used to avoid the upper and lower arms from being simultaneously ON. To correct the externally specified voltage value, the coefficient G1 is applied thereto. The dead time may contain an ON/OFF time difference of the transistors of the upper and lower arms.

The multiplier 42 multiplies an output signal from the multiplier 41 by the coefficient G2 that is expressed by $$G_2 = (\text{Detected PN voltage value})/(\text{Set PN voltage value}) \quad (4),$$

where the coefficient G2 is set to satisfy a condition of $0 \leq G_2 \leq 1$.

The detected PN voltage value in the expression (4) is a voltage value (detected voltage value) of the main-circuit capacitor 19. The set PN voltage value in the expression (4) is a voltage value set to charge the main-circuit capacitor 19. The coefficient G2 of the expression (4) becomes smaller when the detected PN voltage value of the main-circuit capacitor 19 decreases relative to the set PN voltage value. Even if the power consumption of the load 18 increases when the detected PN voltage value decreases, the multiplication of the coefficient G2 prevents the externally specified voltage value from suddenly increasing.

This is to prevent a stall of the engine 11 that may occur if the inverter 15 increases, when the PN voltage of the main-circuit capacitor 19 is decreasing, output power to the load 18 in response to an increase in the power consumption of the load 18. To prevent this, the embodiment multiplies the externally specified voltage value by the coefficient G2 to decrease an output signal from the multiplier 42 when the detected PN voltage value is lower than the set PN voltage value. This results in decreasing an output voltage from the inverter 15 and preventing the engine 11 from stalling.

Figure 4:
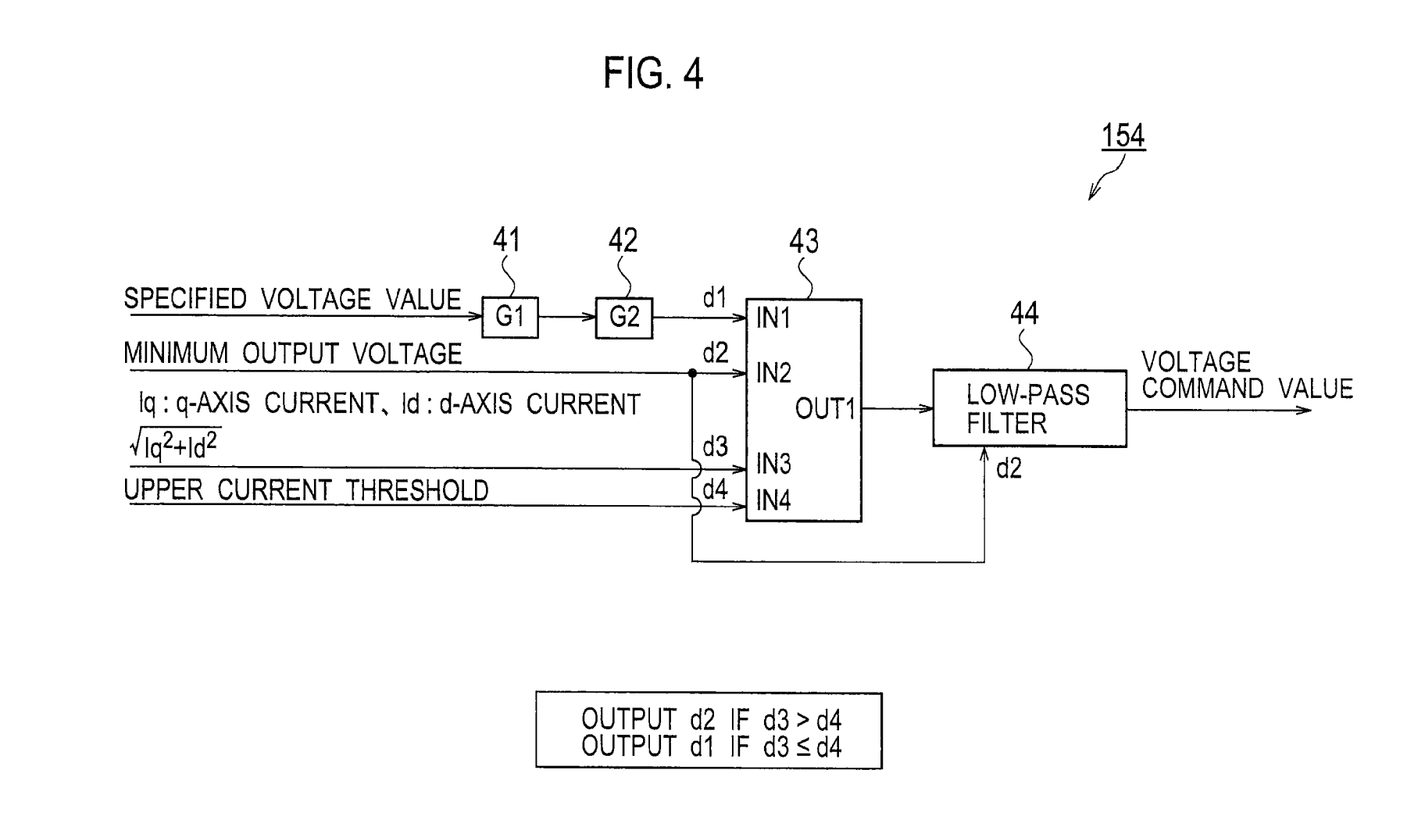
FIG. 4 is a block diagram illustrating a voltage command generator of the inverter of FIG. 2.

The operation unit 43 of the voltage command generator 154 illustrated in FIG. 4 includes input terminals IN1 to IN4 and an output terminal OUT1. The input terminal I1 receives the output signal d1 from the multiplier 42, the input terminal IN2 receives the minimum output voltage d2 the inverter 15 can output, the input terminal IN3 receives the line current d3 passed to the load 18, and the input terminal IN4 receives the upper current threshold d4 that defines an overcurrent. Based on these pieces of data, the operation unit 43 outputs the minimum output voltage d2 from the output terminal OUT1 in a case of "d3>d4" and the signal d1 in the other cases.

If the line current d3 exceeds the upper current threshold d4, i.e., if the current passing through the load 18 is an overcurrent, the minimum output voltage d2 is outputted as a voltage command value to decrease a voltage supplied to the load 18 and prevent the overcurrent from passing to the load 18.

The output signal (d1 or d2) from the operation unit 43 is supplied to the low-pass filter 44 that is capable of changing gain (G3 and G4 to be explained later).

The low-pass filter 44 is arranged to suppress a rush current to the load 18 at the time of, for example, startup of the load 18. If a rush current occurs, the low-pass filter 44 outputs a voltage command value to immediately decrease the output voltage of the inverter 15, and thereafter, outputs voltage command values to gradually increase the decreased output voltage to the externally specified voltage value. The voltage command value from the low-pass filter 44 is supplied to the PWM signal generator 152 and power consumption calculator 155 illustrated in FIG. 2.

The details of the low-pass filter 44 will be explained with reference to FIG. 5. The low-pass filter 44 carries out a filtering process according to the output signal (d1 or d2) from the operation unit 43 and the minimum output voltage d2 and outputs a voltage command value.

Figure 5:
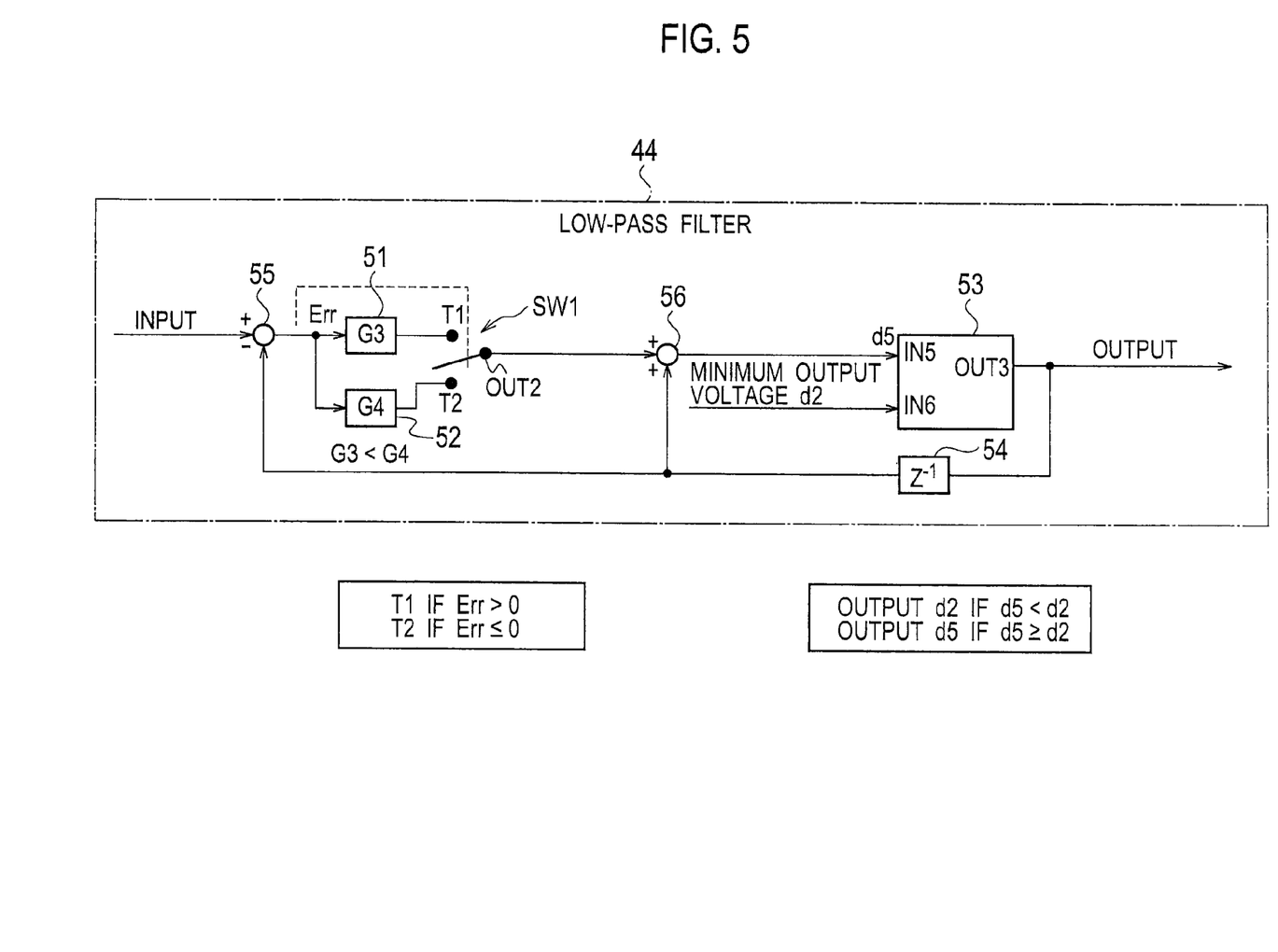
FIG. 5 is a block diagram illustrating a low-pass filter of the voltage command generator of FIG. 4.

As illustrated in FIG. 5, the low-pass filter 44 includes a multiplier 51 employing a coefficient G3 (first coefficient), a multiplier 52 employing a coefficient G4 (second coefficient), an operation unit 53, a delay unit 54, a subtracter 55, an adder 56, and a switch SW1. The coefficients G3 and G4 are set to satisfy a condition of "G4>G3", e.g. G4 being about 10 to 30 times larger than G3.

The subtracter 55 calculates a difference between an input signal (the output signal from the output terminal QUT1 of the operation unit 43 illustrated in FIG. 4) and a feedback signal (a preceding output from the operation unit 53) and outputs the difference as a deviation (error) Err.

The multiplier 51 multiplies the deviation Err by the coefficient G3 and outputs the product to a terminal T1 of the switch SW1. The multiplier 52 multiplies the deviation Err by the coefficient G4 and outputs the product to a terminal T2 of the switch SW1.

If the deviation Err is positive (Err>0), the switch SW1 connects the terminal T1 to an output terminal OUT2, to output the output signal of the multiplier 51. If the deviation Err is zero or negative (Err≤0), the switch SW1 connects the terminal T2 to the output terminal OUT2, to output the output signal of the multiplier 52. The output terminal OUT2 is connected to the adder 56, which is connected to an input terminal IN5 of the operation unit 53. An input terminal IN6 of the operation unit 53 receives the minimum output voltage d2 illustrated in FIG. 4.

The adder 56 adds the signal from the output terminal OUT2 of the switch SW1 and the preceding output value from the delay unit 54 to each other and outputs a sum signal d5 to the input terminal IN5 of the operation unit 53.

In a case of d5<d2, the operation unit 53 outputs d2 from an output terminal OUT3, to clamp the output signal of the output terminal OUT3 to the minimum output voltage d2. In a case of d5≥d2, the operation unit 53 outputs d5 from the output terminal OUT3. The output signal from the output terminal OUT3 is supplied as a voltage command value to the PWM signal generator 152 and power consumption calculator 155 illustrated in FIG. 2. The output signal is also supplied as a feedback signal to the delay unit 54 illustrated in FIG. 5.

The output signal delayed by one sampling period in the delay unit 54 is supplied to the subtracter 55 and adder 56. As mentioned above, the switch SW1 multiplies the deviation Err by the coefficient G3 if the deviation Err is positive (Err>0) and by the coefficient G4 (G4>G3) if the deviation Err is zero or negative (Err≤0). Namely, if the externally specified voltage value tends to increase, the switch SW1 uses the smaller coefficient (G3) than if the same tends to decrease. Accordingly, if the voltage command value (OUT1 of FIG. 4) increases after, for example, the occurrence of a rush current, the low-pass filter 44 slows an increasing speed of the voltage command value.

Namely, when the voltage command value (OUT1) tends to decrease, the low-pass filter 44 uses the larger coefficient G4 to change the voltage command value at a first tracking speed. When the voltage command value (OUT1) tends to increase, the low-pass filter 44 used the smaller coefficient G3 to change the voltage command value at a second tracking speed that is slower than the first tracking speed.

The operation unit 53 of the low-pass filter 44 compares the output signal d5 from the adder 56 with the minimum output voltage d2, and if d5 is lower than d2, i.e., if the sum from the adder 56 is lower than the minimum output voltage d2, outputs the minimum output voltage d2 as a voltage command value to be outputted from the output terminal OUT3. This clamps the externally specified voltage value to the minimum output voltage d2, to prevent, for example, the contactor 18*a*, which is attached to the load 18 and controls the ON/OFF of the load 18, from being cut off.

The details of the frequency command generator 153 illustrated in FIG. 2 will be explained with reference to FIG. 6. The frequency command generator 153 includes a sweep unit (multiplying factor calculator) 61 that continuously changes, or sweeps, the externally specified frequency value within a predetermined range, a multiplier 62 that multiplies an output from the sweep unit 61 by a coefficient K (0<K≤1), and a subtracter 63.

The sweep unit 61 calculates a multiplying factor B according to the externally specified frequency value specified from the outside of the inverter 15 and outputs the calculated multiplying factor B to the multiplier 62. The multiplying factor B is calculated by $$B = 1 - \{(\text{Voltage command value } V_2)/(\text{Specified voltage value } V_1)\} \quad (5).$$

A frequency command value $f_c$ to be outputted from the subtracter 63 is obtained by $$(\text{Frequency command value}) = f_1 \times (1 - K \times B) \quad (6).$$

In the expression (6), $f_1$ is the externally specified frequency value and K is the coefficient set in the multiplier 62 and satisfies a relationship of 0<K≤1.

If the externally specified voltage value V1 is 200 volts, the voltage command value V2 is 140 volts, and the externally specified frequency value is $f_1$, B will be 0.3 according to the expression (5). Accordingly, the sweep unit 61 outputs a signal of "0.3×$f_1$". If the coefficient K set in the multiplier 62 is 0.5, the multiplier 62 provides an output signal of "0.15×$f_1$", which is supplied to the subtracter 63. The subtracter 63 provides an output signal of "0.85×$f_1$" that is 15% lower than the externally specified frequency value f1 and is outputted as a frequency command value.

Thereafter, the voltage command value V2 increases to agree with the externally specified voltage value V1. Then, the multiplying factor B according to the expression (5) becomes zero, and therefore, the externally specified frequency value $f_1$ is not subtracted by the subtracter 63 and is outputted as it is as a frequency command value. In this way, the externally specified frequency value is continuously changed or swept within the range of "0.85×$f_1$" to $f_1$. Gradually increasing the frequency command value up to the externally specified frequency value $f_1$ results in efficiently supplying energy to the load 18 when the load 18 is an induction load such as an induction motor. This results in shortening a startup time of the load 18 and reducing load on the engine 11 and converter 14.

Operation of the inverter power generator 100 having the above-mentioned configuration will be explained.

Figure 8:
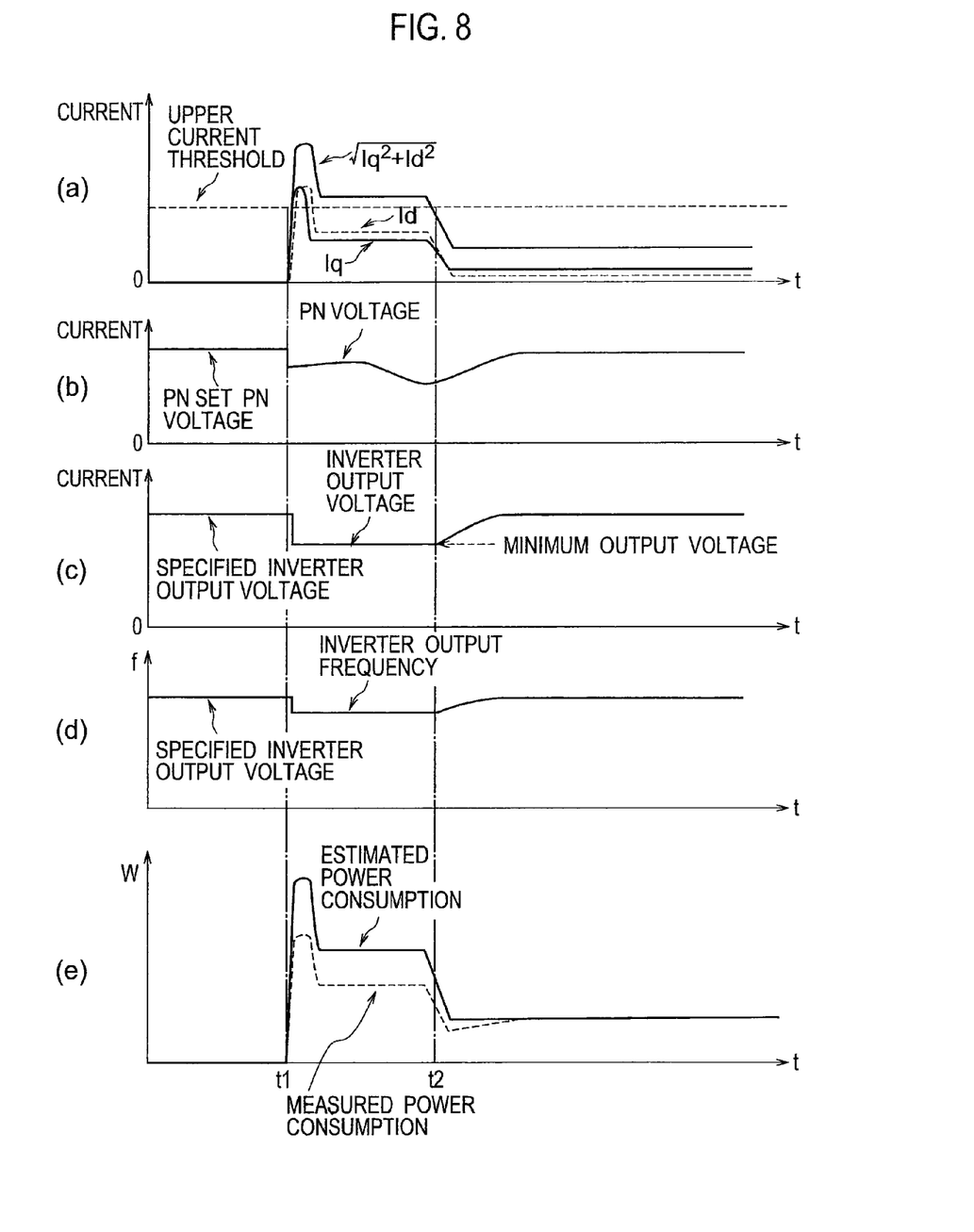
FIG. 8 is a timing chart illustrating signals in the inverter of FIG. 2.

FIG. 8 is a timing chart illustrating waveforms in the inverter 15 of the inverter power generator 100. In FIG. 8, (a) illustrates line current passing through wiring connected to the load 18, (b) illustrates PN voltage across the main-circuit capacitor 19, (c) illustrates output voltage from the inverter

15, (d) illustrates frequency of the output voltage from the inverter 15, and (e) illustrates estimated power consumption. In the following explanation, the load 18 is assumed to be an induction motor.

In FIG. 8, a start switch (not illustrated) of the induction motor 18 is turned on at time t1. As illustrated in (a) of FIG. 8, q- and d-axis currents Iq and Id arise. The line current is the vector sum of the q- and d-axis currents Iq and Id and exceeds an upper current threshold just after the start switch is turned on, thereby satisfying the condition of "d3>d4" illustrated in FIG. 4. As a result, the operation unit 43 provides the minimum output voltage (d2) as an output voltage from the output terminal OUT1. Due to this, the PN voltage becomes slightly lower than the set PN voltage as illustrated in (b) of FIG. 8 and the output voltage from the inverter 15 decreases to the minimum output voltage as illustrated in (c) of FIG. 8.

Figure 6:
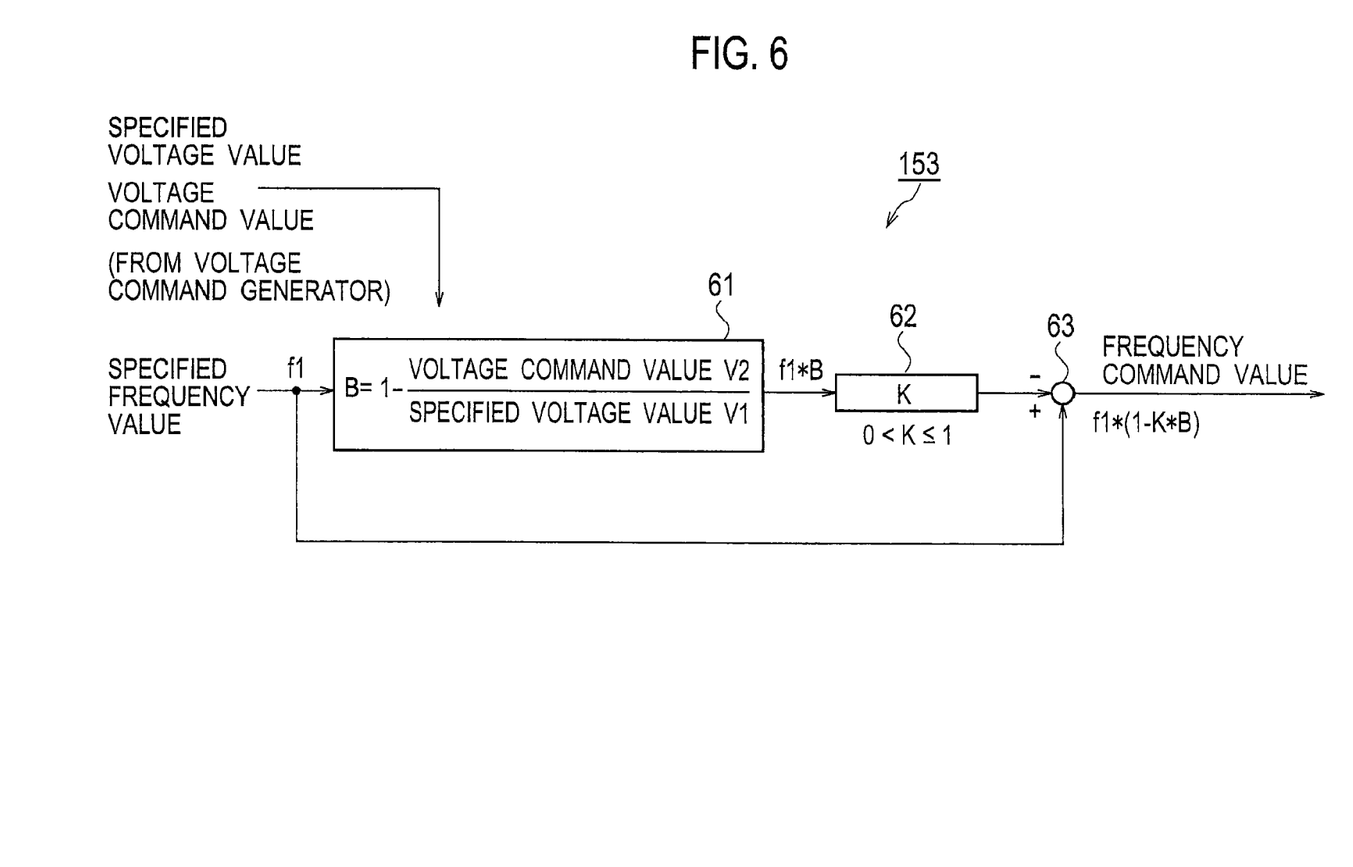
FIG. 6 is a block diagram illustrating a frequency command generator of the inverter of FIG. 2.

The output voltage value becomes smaller than the externally specified voltage value, and therefore, the sweep unit 61 illustrated in FIG. 6 provides an output signal of, for example, "0.3×$f_1$" and the subtracter 63 provides an output signal of "0.85×$f_1$". As a result, the inverter 15 provides an output frequency that is slightly (for example, 15%) lower than the externally specified frequency value f1, as illustrated in (d) of FIG. 8.

Due to this, power consumption (estimated power consumption value) calculated by the power consumption calculator 155 becomes larger than a measured power consumption value, as illustrated in (e) of FIG. 8. According to this estimated power consumption value and the correspondence table 155a (FIG. 7), a rotation speed of the engine 11 is determined. Namely, the estimated power consumption value that is larger than the actual power consumption value of the load 18 is used to control the rotation speed of the engine 11. This means that, just after the start of the load 18, the engine 11 is driven at a rotation speed that is higher than a rotation speed corresponding to the actual power consumption value. This prevents the engine 11 from stalling.

Thereafter, the current (line current) passing through the load (induction motor) 18 decreases, and at time t2, becomes lower than the upper current threshold. Then, the output voltage of the inverter 15 changes toward the externally specified voltage value.

At this time, if the output voltage of the inverter 15 is suddenly changed to the externally specified voltage value, the line current will again exceed the upper current threshold. In addition, in an end period of the startup stage of the load 18, the PN voltage is lower than the set PN voltage value as illustrated in (b) of FIG. 8. Accordingly, the embodiment gradually increases the output voltage of the inverter 15. For this, the multiplier 42 illustrated in FIG. 4 is used to multiply an output signal from the multiplier 41 by the coefficient G2 of the expression (4), to gradually increase the output voltage of the inverter 15 to the externally specified voltage value in proportion to an increase in the PN voltage. This prevents the line current from suddenly increasing and the contactor 18a connected to the load (induction motor) 18 from being disconnected.

Figure 9:
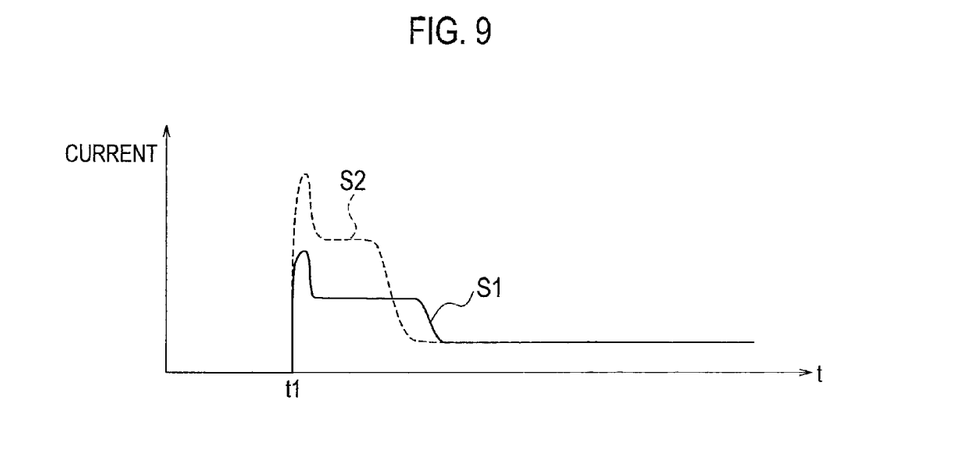
FIG. 9 is a timing chart illustrating output currents from the inverter of FIG. 2 with and without a voltage command value being changed.

FIG. 9 is a timing chart illustrating the line current that changes as time passes and corresponds to (a) of FIG. 8. In FIG. 9, a curve S1 is of the case that lowers the output voltage of the inverter 15 at startup of the load (induction motor) 18 and a curve S2 is of the case that does not lower the output voltage of the inverter 15 at startup. Comparing the curves S1 and S2 with each other, it is understood that the curve S1 suppresses a maximum value thereof lower than that of the curve S2. Namely, lowering the output voltage of the inverter 15 at startup of the load 18 results in suppressing an increase in the line current passed to the load 18. This helps reduce the size of semiconductor elements used to control the inverter 15.

Figure 10:
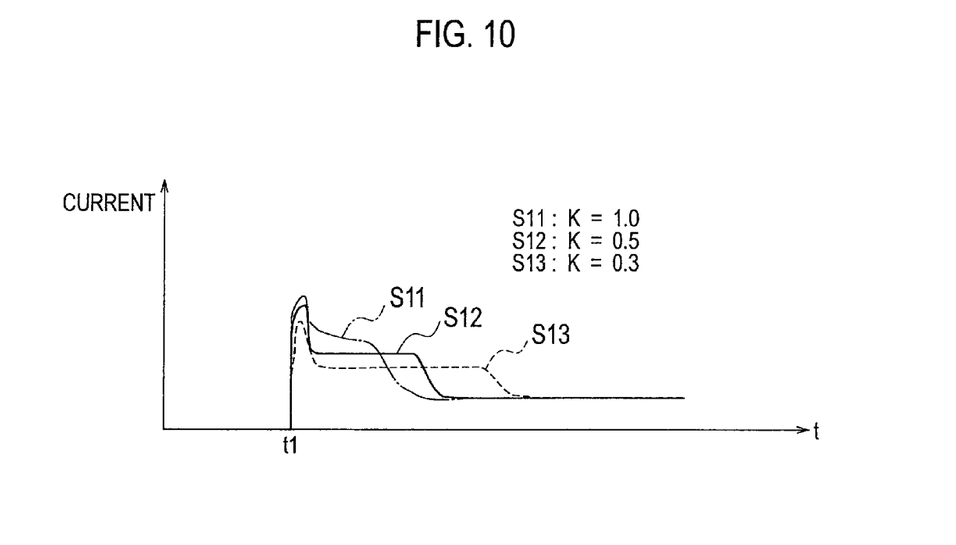
FIG. 10 is a timing chart illustrating output currents from the inverter of FIG. 2 with different frequency multiplying factors.

FIG. 10 is a timing chart illustrating a rush current that changes depending on whether or not the output frequency of the inverter 15 is changed. In FIG. 10, a curve S11 represents the case of K=1.0 with reference to FIG. 6, a curve S12 of K=0.5, and a curve S13 of K=0.3 in the same manner.

As is understood from the curves S11 to S13, the larger K shortens the startup time of the load 18 and increases the rush current. On the other hand, the smaller K reduces the rush current and extends the startup time. The embodiment properly sets the coefficient K to suppress the rush current at startup of the load 18.

In this way, the inverter power generator 100 according to the embodiment starts up the load motor 18 by setting a voltage command value to be outputted to the PWM signal generator 152 to a smaller value, thereby decreasing an AC voltage to be outputted from the inverter 15. At this time, the embodiment maintains the minimum output voltage (FIG. 4) that is set not to cut off the contactor 18a attached to the load 18.

The embodiment is capable of preventing a sudden increase in a current passed to the load 18, as well as an overcurrent. The embodiment, therefore, allows parts such as semiconductor elements of the inverter power generator 100 to have a lower withstand current. This results in reducing the size of semiconductor elements such as transistors used for the switching circuit 150.

At startup of the load 18, the embodiment continuously changes or sweeps a frequency command value, to shorten a startup time of the load 18 when the load 18 is an induction motor. Shortening the startup time is equal to efficiently transferring energy to the load 18 and reducing load on the converter 14 and engine 11 that supply the energy.

Although the present invention has been explained with reference to the embodiment, the present invention is not limited to the embodiment. The configuration of any part of the embodiment is replaceable with any other configuration that may provide like functions.

For example, although the embodiment arranges the ammeter 157 for each phase as illustrated in FIG. 2, the ammeter may be arranged for only two phases.

As mentioned above, the inverter power generator 100 according to the embodiment of the present invention chooses a predetermined minimum output voltage if an output current from the switching unit 150 exceeds an upper current threshold, generates a voltage command value and PWM signal based on the minimum output voltage, and drives the inverter 15 with the PWM signal. Accordingly, the present invention is capable of suppressing a current increase at startup of the load 18 and preventing the prime mover (engine) 11 from stalling.

The prevent invention is applicable to improve the efficiency of any inverter power generator.

This application claims benefit of priority under 35 USC §119 to Japanese Patent Application No. 2011-054533, filed on Mar. 11, 2011, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. An inverter power generator having a prime mover, a synchronous motor coupled with the prime mover, a converter connected to the synchronous motor, an inverter connected to the converter, and a capacitor arranged between the converter and the inverter, the prime mover rotating the synchronous motor to generate AC power, the converter converting the AC power into DC power, and the inverter inverting the DC power into AC power of a required frequency, the inverter comprising:
    a voltage command generator generating a voltage command value according to an externally specified voltage value and outputting the voltage command value;
    a frequency command generator generating a frequency command value according to an externally specified frequency value and outputting the frequency command value;
    a PWM signal generator generating a PWM signal according to the voltage command value and frequency command value;
    a switching unit configured to turn on/off a plurality of semiconductor elements according to the PWM signal and generate the AC power of the required frequency; and
    a current detector detecting an output current of the switching unit, wherein
    the voltage command generator includes a voltage command changer configured to:
    (i) generate and output a voltage value corresponding to the externally specified voltage value in a normal state where the output current detected by the current detector is equal to or lower than a preset upper current threshold, and
    (ii) output a voltage value corresponding to a minimum output voltage that is preset to be lower than the externally specified voltage value in a case where the output current is higher than the upper current threshold.

2. The inverter power generator of claim 1, wherein the minimum output voltage is preset to a voltage value that is lower than the externally specified voltage value and is suppressed in order not to cut off a contactor that controls the start and stop of a load driven with the AC power from the inverter.

3. The inverter power generator of claim 1, wherein the voltage command generator further includes a corrector that calculates a ratio of a PN voltage value of the capacitor to a PN voltage value to charge the capacitor and multiplies the externally specified voltage value by the calculated ratio to calculate the voltage command value in the normal state.

4. The inverter power generator of claims 1, wherein the voltage command generator further includes a filter after the voltage command changer,
    the filter changes and outputs the voltage command value at a first tracking speed as the voltage command value from the voltage command changer tends to decrease, changes and outputs the voltage command value at a second tracking speed that is slower than the first tracking speed as the voltage command value from the voltage command changer tends to increase.

5. The inverter power generator of claim 4, wherein the filter comprises:
    a multiplier configured to evaluate a deviation of the voltage command value of the voltage command changer from a preceding voltage command value of the voltage command generator, multiply the deviation by a first coefficient as the deviation is positive and multiply the same by a second coefficient that is greater than the first coefficient as the deviation is negative;
    an adder configured to add a result of the multiplication of the multiplier to the preceding voltage command value and provide a result of the addition as a new voltage command value; and
    an operation unit configured to compare the new voltage command value with a minimum voltage command value corresponding to the minimum output voltage, output the new voltage command value as the voltage command value from the voltage command generator if the new voltage command value is greater than the minimum voltage command value, and if the new voltage command value is equal to or lower than the minimum voltage command value, clamps the voltage command value to the minimum voltage command value so that the minimum voltage command value is outputted as the voltage command value from the voltage command generator.

6. The inverter power generator of claims 1, wherein the frequency command generator calculates a multiplying factor B according to:

$$B=1-V_2/V_1,$$

where $V_1$ is the externally specified voltage value and $V_2$ is the voltage command value from the voltage command generator, and
    generates the frequency command value $f_c$ according to:

$$f_c=f_1\times(1-K\times B),$$

where $f_1$ is the externally specified frequency value and K is a coefficient.

7. The inverter power generator of claims 1, further comprising:
    a power consumption calculator configured to calculate power consumption of the load according to the voltage command value of the voltage command generator and the output current value detected by the current detector, wherein
    the power consumption calculator includes a correspondence table that indicates a relationship between calculated power consumption and rotation speed of the prime mover, determines a rotation speed of the prime mover according to the calculated power consumption and the correspondence table, and commands the prime mover with the determined rotation speed.

8. The inverter power generator of claim 7, wherein the power consumption calculator finds an impedance Z of effective power according to a q-axis current, d-axis current, and line current detected by the current detector and an output voltage of the inverter and calculates the power consumption $P_1$ of the load as a function of the impedance Z and externally specified voltage value according to a relationship of, $$P_1 = \sqrt{3} \times \frac{(\text{Externally specified voltage})^2}{Z}.$$

* * * * *